(12) United States Patent
Bracha (10) Patent No.: US 7,574,700 B2
(45) Date of Patent: Aug. 11, 2009

(54) SUPPORTING DYNAMICALLY-TYPED LANGUAGES IN TYPED ASSEMBLY LANGUAGES

(75) Inventor: Gilad Bracha, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 602 days.

(21) Appl. No.: 11/096,933

(22) Filed: Mar. 31, 2005

(65) Prior Publication Data

US 2006/0225045 A1    Oct. 5, 2006

(51) Int. Cl.
*G06F 9/45* (2006.01)

(52) U.S. Cl. .................... 717/141; 717/134; 717/151

(58) Field of Classification Search .......... 717/108, 717/114, 115–117, 136–141
See application file for complete search history.

(56) References Cited

U.S. PATENT DOCUMENTS

| 5,740,441 | A | * | 4/1998 | Yellin et al. ............... 717/134 |
| 5,966,702 | A | * | 10/1999 | Fresko et al. ............... 707/1 |
| 5,999,731 | A | * | 12/1999 | Yellin et al. ............... 717/126 |
| 6,081,665 | A | * | 6/2000 | Nilsen et al. ............... 717/116 |
| 6,247,171 | B1 | * | 6/2001 | Yellin et al. ............... 717/126 |
| 6,327,700 | B1 | * | 12/2001 | Chen et al. ............... 717/127 |
| 6,330,709 | B1 | * | 12/2001 | Johnson et al. ............ 717/100 |
| 6,338,160 | B1 | * | 1/2002 | Patel et al. ............... 717/139 |
| 6,438,745 | B1 | * | 8/2002 | Kanamaru et al. ......... 717/137 |
| 6,477,702 | B1 | | 11/2002 | Yellin et al. |
| 6,513,156 | B2 | * | 1/2003 | Bak et al. ................ 717/151 |
| 6,591,416 | B1 | * | 7/2003 | Bak et al. ................ 717/159 |
| 6,658,573 | B1 | * | 12/2003 | Bischof et al. ............ 726/16 |
| 6,704,923 | B1 | | 3/2004 | Gosling |
| 6,745,384 | B1 | * | 6/2004 | Biggerstaff ............... 717/156 |
| 6,910,205 | B2 | * | 6/2005 | Bak et al. ................ 717/151 |
| 7,058,929 | B2 | * | 6/2006 | Charnell et al. ............ 717/135 |
| 7,080,366 | B2 | * | 7/2006 | Kramskoy et al. .......... 717/148 |
| 7,103,882 | B2 | * | 9/2006 | Kawahito ................ 717/151 |
| 2002/0188827 | A1 | * | 12/2002 | Long ..................... 712/213 |
| 2003/0154468 | A1 | | 8/2003 | Gordon et al. |

OTHER PUBLICATIONS

Bracha, Gilad, "Generics in the Java Programming Language," [online], Jul. 5, 2004, [retrieved on Jun. 14, 2005]. Retrieved from the Internet: <http://java.sun.com/j2se/1.5/pdf/generics-tutorial.pdf>, pp. 1-23.

(Continued)

*Primary Examiner*—Wei Y Zhen
*Assistant Examiner*—Phillip H Nguyen
(74) *Attorney, Agent, or Firm*—Osha • Liang LLP (57) ABSTRACT

In accordance with one embodiment of the present invention, a technique for supporting dynamically typed languages in typed assembly languages is provided. According to one embodiment, a new bytecode instruction, "invokedynamic," supplements "invokevirtual." Prior to the execution of a typed assembly language program, it is determined whether a particular method-invoking instruction is a particular kind of instruction. If the instruction is of the particular kind, then the verifier refrains from performing the usual pre-execution type checking of the arguments that will be on the operand stack when the instruction is executed. Consequently, the bytecode instruction may be used to represent the invocation of a method that might not indicate formal parameter types. Because the verifier performs less stringent type checking in response to such an instruction, the JVM can execute assembly language programs that were generated based on source code that was written in a dynamically typed language.

21 Claims, 3 Drawing Sheets

OTHER PUBLICATIONS

Duggan, Dominic, "Sharing in Typed Module Assembly Language," Types in Compilation, Third International Workshop, 2001, XP-002384687, pp. 85-116.

European Patent Office, "Extended European Search Report," App. No. 06251778.4, dated Jun. 23, 2003, 4 pages.
Claims as Filed, App. No. 06251778.4, 10 pages.

* cited by examiner

SUPPORTING DYNAMICALLY-TYPED LANGUAGES IN TYPED ASSEMBLY LANGUAGES

BACKGROUND

The Java Virtual Machine (JVM) runs a Java program by executing "bytecodes." Each bytecode is an instruction, usually one byte in size, which tells the JVM to perform a specific operation. Java bytecode language is a form of assembly language.

Among the bytecodes recognized by the JVM is a particular bytecode called "invokevirtual." The "invokevirtual" bytecode represents the invocation of a virtual method in corresponding Java source code (a virtual method is a method that can be overridden in a subclass). The "invokevirtual" bytecode is accompanied by an operand that identifies both a class and a method of that class; the operand identifies the method that is to be invoked. In practice, the operand is a 16-bit index into a table that is called the "constant pool;" this table contains information about the method.

Before the "invokevirtual" bytecode is executed for a particular method, one or more operands need to be pushed onto the operand stack. For example, a reference to the object relative to which the particular method is to be invoked (the "receiver") needs to be pushed onto the operand stack. Additionally, if the particular method requires any parameters, then the actual parameters that are being passed to the invocation of the particular method need to be pushed onto the operand stack also. These operands are pushed onto the operand stack via the "push" bytecode.

Unlike some other assembly languages, the Java bytecode language is typed. A mechanism of the JVM called the "verifier" examines the bytecodes before execution and tracks the types of the operands that are going to be pushed onto the operand stack. Before the program containing the bytecode is executed, the verifier determines whether the types of the operands that will be on the stack at the time that the "invokevirtual" bytecode is executed will match the types of the formal parameters that correspond to those operands (the types of the formal parameters are indicated in the declaration of the method that is to be invoked). If the verifier detects any mismatch, then the verifier may indicate the presence of an error.

For example, if the declaration of a method "C.foo( )" specifies two formal parameters, "bar" and "baz," and if "bar" is declared to be type "Integer" while "baz" is declared to be type "List," then the verifier will determine whether, at the time that the "invokevirtual" bytecode for method "C.foo( )" will be executed, the operands on the operand stack will be of types "Integer" and "List," respectively.

The type checking performed by the verifier helps to ensure that the Java runtime environment is safe and robust. Among other assurances, preventing type mismatches helps to ensure that bytecodes are not used for purposes for which they were not intended, so that, for example, a Java program cannot perform operations that will corrupt memory areas that have not been reserved to that program. When bytecode is downloaded from the Internet, the bytecode may be passed through the verifier prior to execution to make sure that the bytecode will not perform any forbidden operations when executed. After the bytecode has been verified once, there is no need to type check the bytecode every time the bytecode is executed. Due to this fact, bytecode may be executed more rapidly.

Generally speaking, Java is a statically typed language. In Java source code, a type usually needs to be declared expressly for each object. However, not every programming language is statically typed in this manner. For example, the Perl and Python programming languages do not require type declarations; rather than being statically typed, these languages are dynamically typed. Despite these latter languages being dynamically typed, it would be beneficial if bytecode that was generated based on programs written in these languages could be executed by the JVM.

However, because the verifier currently requires the actual arguments that are on the operand stack to match the declared types of the formal parameters of an invoked method when the "invokevirtual" bytecode is executed, bytecode representations of programs that are written in dynamically typed languages will always cause the verifier to issue an error and prevent execution. There are typically no declared types for formal parameters of methods in such programs, so the verifier has no way of checking the types of the arguments that are on the operand stack.

SUMMARY

In accordance with one embodiment of the present invention, there is provided a technique for supporting dynamically typed languages in typed assembly languages. According to one embodiment, a new bytecode instruction, "invokedynamic," supplements the existing "invokevirtual" bytecode instruction. Like "invokevirtual," "invokedynamic" tells the JVM to invoke a specified method. However, "invokedynamic" does not cause the verifier to perform all of the stringent pre-execution type checking that "invokevirtual" causes a verifier to perform.

In one embodiment, prior to the execution of a typed assembly language program (e.g., a program that comprises Java bytecodes), it is determined whether a particular instruction, which invokes a programmatic method when executed, is a particular kind of instruction. For example, the verifier may determine whether a particular bytecode instruction within a Java bytecode program is an "invokedynamic" instruction.

If the particular instruction is of the particular kind (e.g., if the particular bytecode instruction is "invokedynamic" rather than "invokevirtual"), then the verifier refrains from performing the usual stringent pre-execution type checking of the arguments that will be on the operand stack when the particular instruction is executed. In one embodiment, at least some aspects of type checking are deferred until run time under such circumstances.

Alternatively, if the particular instruction is not of the particular kind (e.g., if the particular bytecode instruction is "invokevirtual" rather than "invokedynamic"), then the verifier performs the usual stringent pre-execution type checking of the arguments that will be on the operand stack when the particular instruction is executed. If the argument's types do not match the types of the corresponding formal parameters that are declared for the programmatic method, then the verifier prevents the assembly language program from being executed.

As a result, the particular kind of instruction (e.g., "invokedynamic") may be used to represent, in bytecode, the invocation of a programmatic method that does not necessarily specify the types of the method's formal parameters. Because the verifier performs less stringent type checking in response to such an instruction, the JVM can execute assembly language programs that were generated based on source code that was written in a dynamically typed language.

DETAILED DESCRIPTION OF EMBODIMENT(S)

Overview

In accordance with one embodiment of the present invention, techniques are provided for supporting dynamically typed languages, including object-oriented languages, in typed assembly languages. An operational flow diagram, which illustrates a high level overview of the operation of one embodiment of the present invention, is shown in FIG. 1.

Figure 1:
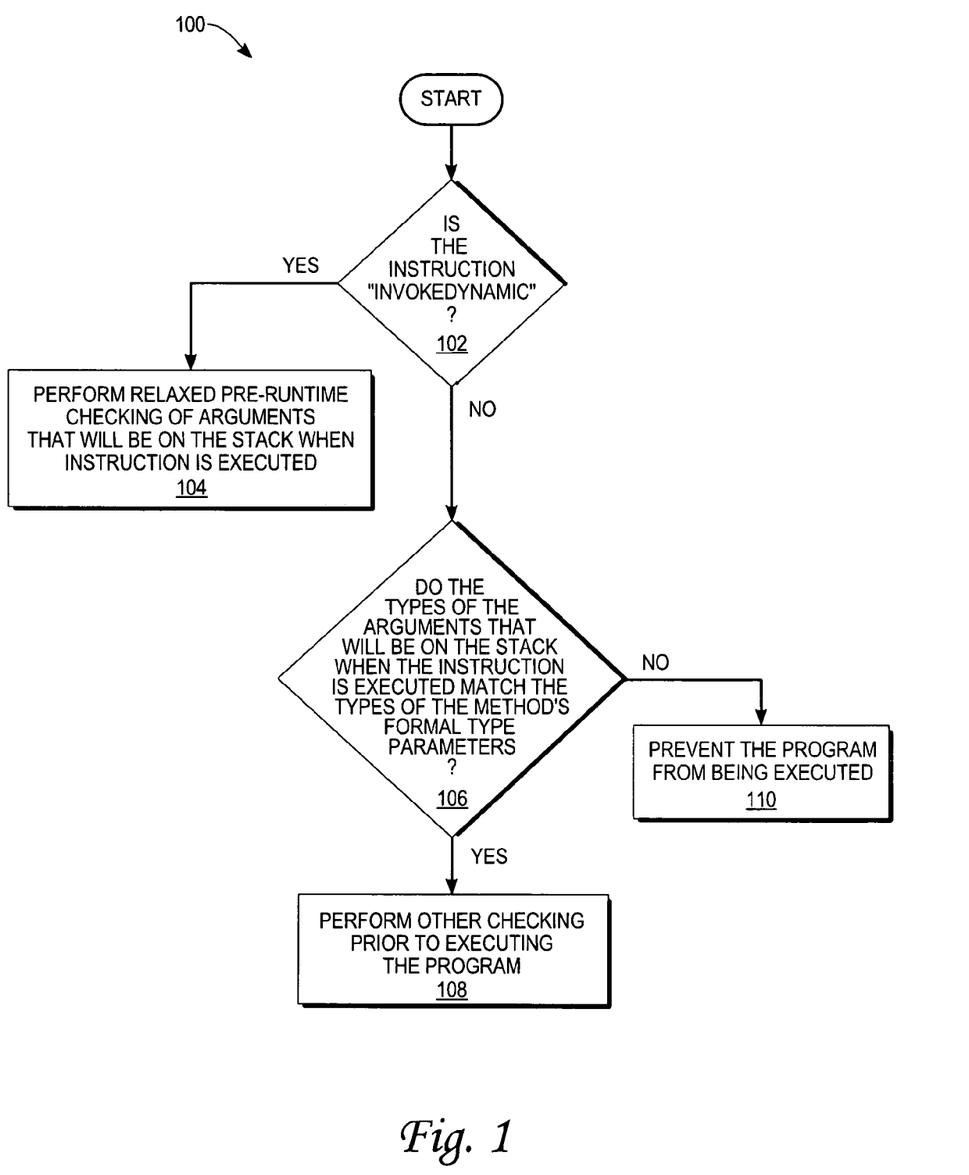
FIG. 1 is a flow diagram that illustrates an overview of the operation of an embodiment of the present invention.

Referring to FIG. 1, in block 102, prior to the execution of an assembly language program that contains a particular instruction that invokes a programmatic method when executed, it is determined whether the particular instruction is "invokedynamic." For example, the verifier of a JVM may make such a determination prior to executing a bytecode program. Although the instruction label "invokedynamic" is used herein for purposes of illustration, alternative embodiments may use different labels for such an instruction. If the particular method-invoking instruction is "invokedynamic," then control passes to block 104. Otherwise, the particular instruction is some other instruction that invokes a programmatic method when executed (e.g., "invokevirtual"), and control passes to block 106.

In block 104, if the particular instruction is "invokedynamic," then the usual pre-execution checking of the types of the arguments that will be on the stack when the particular instruction is executed, which checking usually would be performed in response to an "invokevirtual" instruction, is not all performed prior to run time. Instead, a more relaxed form of checking may be performed prior to run time. Unlike in the usual pre-execution type checking, in the more relaxed checking, the types of the arguments that will be on the stack, or the lack of such types, will not, by themselves, cause the verifier to prevent the assembly language program from executing.

However, other checking may be performed relative to the arguments that will be on the stack, and the outcome of this other checking may cause the verifier to prevent the program from executing. Some examples of this other checking are described further below. Furthermore, the types of the arguments that are on the operand stack at the time that the instruction is about to be executed may be checked later, at run time, to prevent a program from behaving erratically.

Alternatively, in block 106, if the particular instruction is a method-invoking instruction other than "invokedynamic," such as "invokevirtual," then it is determined whether the types of the arguments that will be on the stack at the time that the particular instruction is executed match the corresponding types of the formal parameters of the method that is to be invoked. For example, if the particular instruction, represented symbolically rather than literally, is "invokevirtual C.foo( )," and if the declaration of method "C.foo( )" indicates that "C.foo( )" has two formal parameters, of types "Integer" and "List," respectively, then the verifier may determine whether the types of the two arguments that will be on the operand stack at the time that the "invokevirtual" instruction is executed actually will be "Integer" and "List." If the types of the arguments match the types of the formal parameters, then control passes to block 108. Otherwise, control passes to block 110.

In block 108, other checking may be performed prior to the execution of the assembly language program. For example, the verifier may perform additional checking relative to the particular instruction and other instructions in the assembly language program. If all of this other checking yields a satisfactory outcome, then the JVM may execute the assembly language program.

Alternatively, in block 110, the execution of the assembly language program is prevented. For example, the verifier may issue an error that indicates a type mismatch, and prevent the JVM from executing any of the bytecodes in the assembly language program.

In other aspects, the invention encompasses, in certain embodiments, computer apparatuses, computing systems, and computer-readable media configured to carry out the foregoing technique.

Relaxed Pre-Run Time Type Checking

Figure 2:
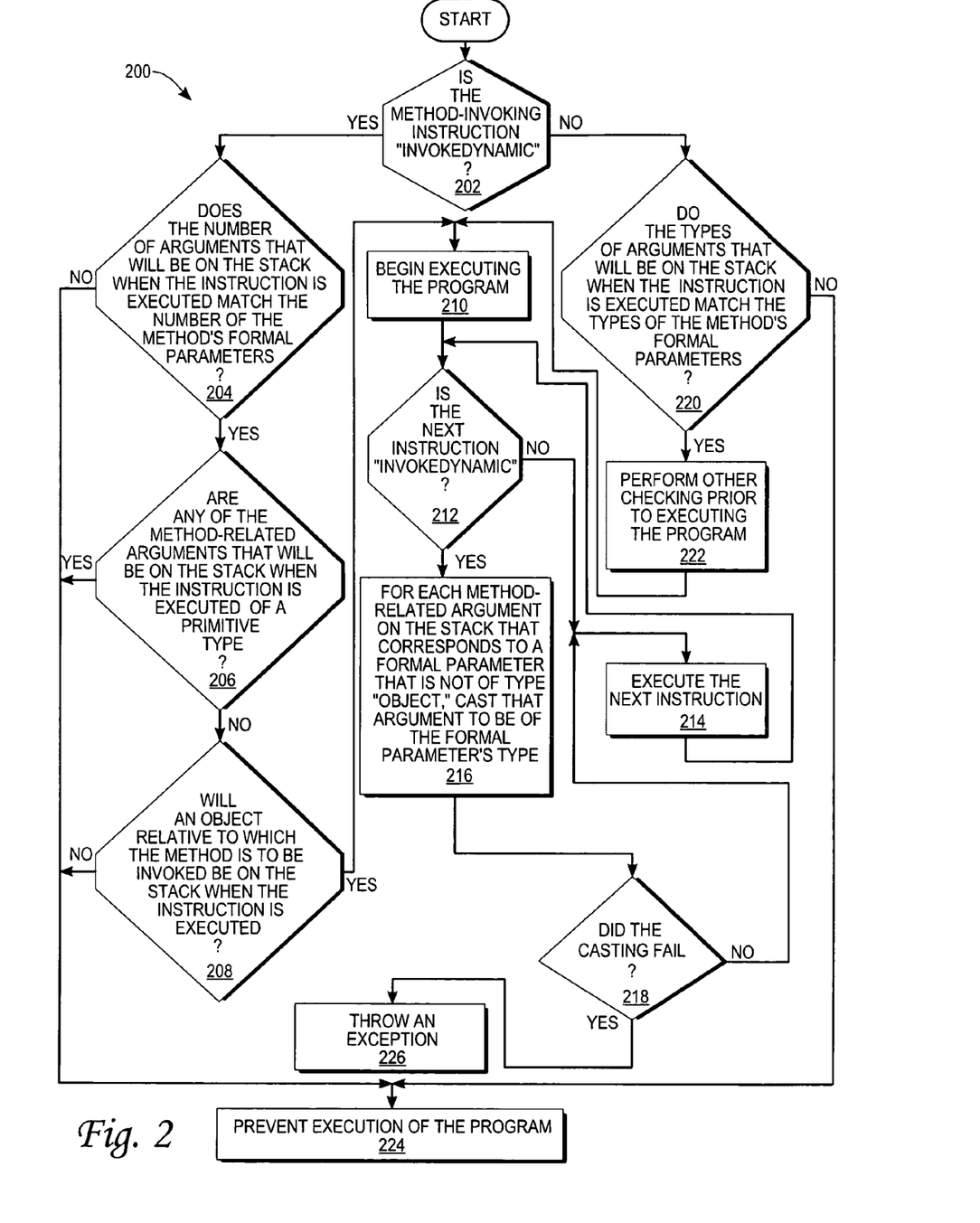
FIG. 2 is a flow diagram that illustrates an example technique for supporting a dynamically typed language in a typed assembly language using relaxed pre-run time type checking, according to an embodiment of the present invention.

FIG. 2 is a flow diagram that illustrates an example technique for supporting a dynamically typed language in a typed assembly language using relaxed pre-run time type checking, according to an embodiment of the present invention. For example, the verifier mechanism of the JVM may perform such a technique. Although the steps of the technique are shown as being in a particular order for purposes of illustration, the steps of the technique may be performed in orders other than the particular order shown in this example.

Referring to FIG. 2, in block 202, prior to the execution of an assembly language program that contains a particular instruction that invokes a programmatic method when executed, it is determined whether the particular instruction is "invokedynamic." For example, the verifier may make such a determination prior to executing a Java bytecode program. Although the instruction label "invokedynamic" is used herein for purposes of illustration, alternative embodiments may use different labels for such an instruction. If the particular method-invoking instruction is "invokedynamic," then control passes to block 204. Otherwise, the particular instruction is some other instruction that invokes a programmatic method when executed (e.g., "invokevirtual"), and control passes to block 220.

In block 204, if the particular instruction is "invokedynamic," then it is determined, prior the execution of the assembly language program, whether a number of arguments that will be on the operand stack at the time that the particular instruction is executed matches a number of formal parameters that are associated with the programmatic method. For example, if the method is "C.foo( )" and the declaration of "C.foo( )" specifies two formal parameters, "bar" and "baz," then the verifier will determine whether, at the time that the "invokedynamic" bytecode for method "C.foo( )" will be executed, there will be at least two arguments on the operand stack besides the reference to the object that contains the method itself. If the number of arguments matches the number of formal parameters, then control passes to block 206. Otherwise, control passes to block 224.

According to one embodiment, in block 206, it is determined, prior the execution of the assembly language program, whether any of the method-related arguments that will be on the operand stack at the time that the particular instruction is executed are of a primitive type (e.g. "Integer"). For example, the verifier may determine, before the execution of the assembly language program, whether any of the arguments that are related to method "C.foo( )" and that will be on the operand stack when the "invokedynamic" bytecode is executed is of a primitive type, and therefore not an object. If any of the arguments is of a primitive type, then control passes to block 224. Otherwise, control passes to block 208.

In the embodiment described above, control passes to block 224 from block 206 if any of the arguments is of a primitive type. However, in an alternative embodiment, the execution of the program is not prevented, as in block 224, even if one or more of the arguments is of a primitive type. Instead, in such an embodiment, the usual stringent type checking may be performed relative to the primitive-type arguments prior to execution, while a more relaxed form of checking is performed relative to the non-primitive-type arguments prior to execution; more stringent type checking may be performed relative to these non-primitive-type arguments at run time, in the manner that is described with reference to blocks 216 and 218 below.

In block 208, it is determined, prior the execution of the assembly language program, whether an object relative to which the programmatic method is to be invoked (the "receiver") will be on the operand stack at the time that the particular instruction is executed. For example, if the method to be invoked is "C.foo( )," then the verifier may determine, before the execution of the assembly language program, whether object "C" actually will be on the operand stack at the time that the "invokedynamic" bytecode is executed. In one embodiment, it does not matter whether the receiver is of any particular type; it matters, instead, whether the receiver will be on the stack. If the object will be on the operand stack, then control passes to block 210. Otherwise, control passes to block 224.

In block 210, the execution of the assembly language program begins. For example, the JVM may begin to execute Java bytecode instructions that the verifier checked as discussed above. As is described below, type checking that was not performed relative to the "invokedynamic" instruction before run time may be performed at run time to ensure that the program does not behave erratically.

In block 212, during the execution of the assembly language program, it is determined whether the next instruction is "invokedynamic." For example, the JVM may make such a determination while executing a Java bytecode program. If the next instruction to be invoked is "invokedynamic," then control passes to block 216. Otherwise, control passes to block 214.

In block 214, the next instruction is executed. Provided that the assembly language program has not completed execution, control passes back to block 212.

Alternatively, in block 216, if the next instruction is "invokedynamic," then, for each method-related argument on the operand stack that corresponds to a formal parameter that is not of type "Object," an attempt is made to cast that argument to be of the formal parameter's type. For example, if the next instruction, represented symbolically rather than literally, is "invokevirtual C.foo( )," and if the declaration of method "C.foo( )" indicates that "C.foo( )" has two formal parameters "bar" and "baz," of types "Integer" and "Object," respectively, then the JVM may attempt to cast the argument that corresponds to "bar" to type "Integer," but leave the argument that corresponds to "baz" as it is.

In one embodiment, this casting is implemented by providing dual entry points for each method—one that begins with a preamble that performs casts and another that performs the usual operations of the method.

In block 218, it is determined whether the casting attempt performed in block 216 failed. The casting attempt fails if the types of the arguments that are on the stack do not match the corresponding types of the formal parameters of the method that is to be invoked. For example, if the next instruction, represented symbolically rather than literally, is "invokevirtual C.foo( )," and if the declaration of method "C.foo( )" indicates that "C.foo( )" has two formal parameters, of types "Integer" and "List," respectively, then the casting attempt fails unless the types of the two arguments that are on the operand stack actually are "Integer" and "List." If the casting attempt did not fail, then control passes to block 214. Otherwise, control passes to block 226.

Alternatively, in block 220, if the particular instruction is a method-invoking instruction other than "invokedynamic," such as "invokevirtual," then it is determined, prior to execution of the assembly language program, whether the types of the arguments that will be on the stack at the time that the particular instruction is executed match the corresponding types of the formal parameters of the method that is to be invoked. For example, if the particular instruction, represented symbolically rather than literally, is "invokevirtual C.foo( )," and if the declaration of method "C.foo( )" indicates that "C.foo( )" has two formal parameters, of types "Integer" and "List," respectively, then the verifier may determine whether the types of the two arguments that will be on the operand stack at the time that the "invokevirtual" instruction is executed actually will be "Integer" and "List." If the types of the arguments match the types of the formal parameters, then control passes to block 222. Otherwise, control passes to block 224.

In block 222, other checking may be performed prior to the execution of the assembly language program. For example, the verifier may perform additional checking relative to the particular instruction and other instructions in the assembly language program. If all of this other checking yields a satisfactory outcome, then the JVM may begin to execute the assembly language program in block 210.

Alternatively, in block 224, the execution of the assembly language program is prevented. For example, the verifier may issue an error, and prevent the JVM from executing any of the bytecodes in the assembly language program.

Alternatively, in block 226, an exception is thrown. For example, the JVM may throw an exception. In response to the throwing of such an exception, the exception handler may halt the execution of the assembly language program. For example, in response to the throwing of such an exception, the JVM may issue an error and cease executing any more of the bytecodes in the assembly language program.

Hardware Overview

Figure 3:
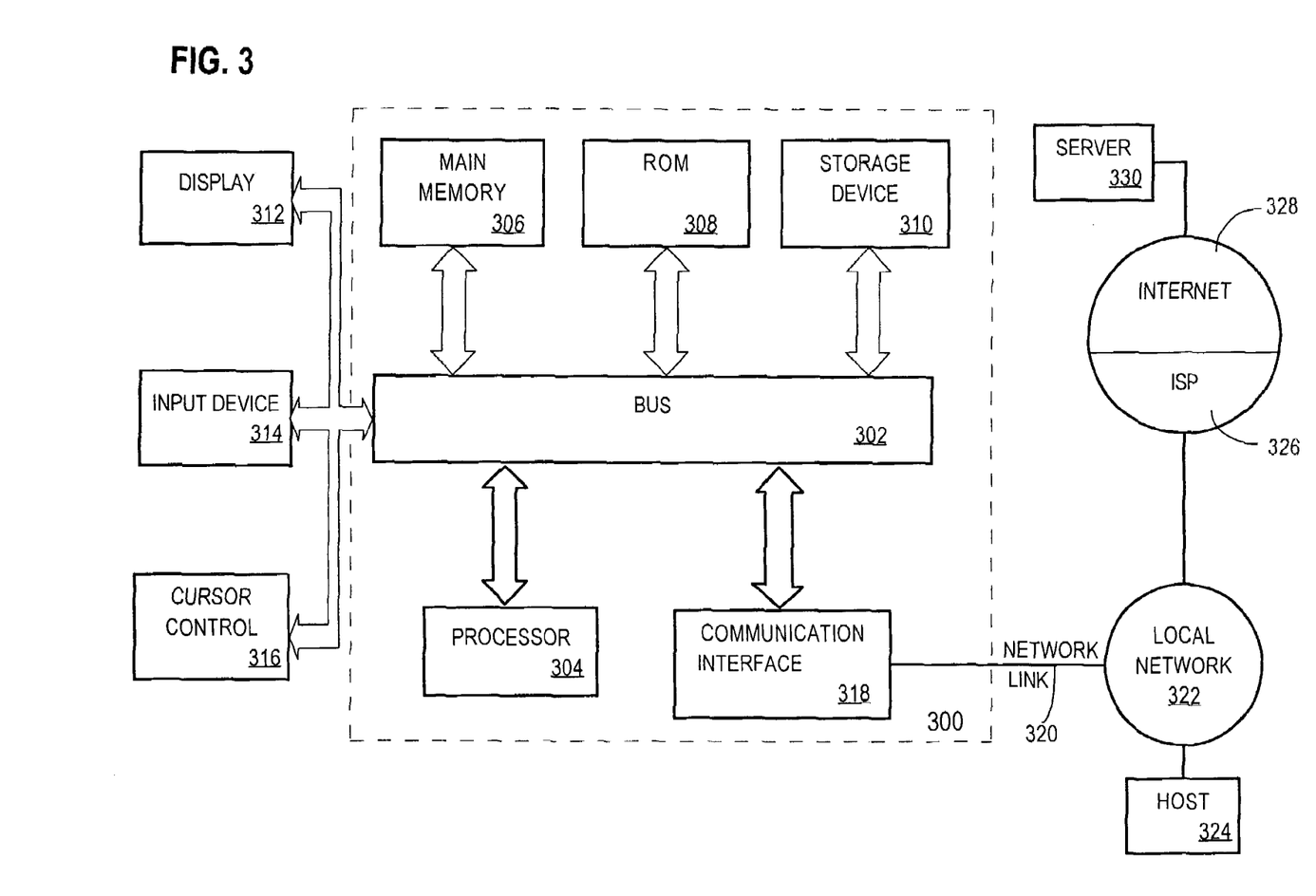
FIG. 3 is a hardware block diagram of an example computer entity, upon which certain embodiments of the invention may be implemented.

FIG. 3 is a block diagram that illustrates a computer system 300 upon which an embodiment of the invention may be implemented. Computer system 300 includes a bus 302 for facilitating information exchange, and one or more processors 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions by processor 304. Computer system 300 may further include a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

In computer system 300, bus 302 may be any mechanism and/or medium that enables information, signals, data, etc., to be exchanged between the various components. For example, bus 302 may be a set of conductors that carries electrical signals. Bus 302 may also be a wireless medium (e.g. air) that carries wireless signals between one or more of the components. Bus 302 may also be a medium (e.g. air) that enables signals to be capacitively exchanged between one or more of the components. Bus 302 may further be a network connection that connects one or more of the components. Overall, any mechanism and/or medium that enables information, signals, data, etc., to be exchanged between the various components may be used as bus 302.

Bus 302 may also be a combination of these mechanisms/media. For example, processor 304 may communicate with storage device 310 wirelessly. In such a case, the bus 302, from the standpoint of processor 304 and storage device 310, would be a wireless medium, such as air. Further, processor 304 may communicate with ROM 308 capacitively. In this instance, the bus 302 would be the medium (such as air) that enables this capacitive communication to take place. Further, processor 304 may communicate with main memory 306 via a network connection. In this case, the bus 302 would be the network connection. Further, processor 304 may communicate with display 312 via a set of conductors. In this instance, the bus 302 would be the set of conductors. Thus, depending upon how the various components communicate with each other, bus 302 may take on different forms. Bus 302, as shown in FIG. 3, functionally represents all of the mechanisms and/or media that enable information, signals, data, etc., to be exchanged between the various components.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   prior to executing a typed assembly language program that contains a particular instruction that invokes a programmatic method when executed, one or more processors performing steps comprising:
   determining whether the particular instruction is a particular kind of instruction;
   if the particular instruction is of the particular kind, then refraining from checking, prior to execution of the assembly language program, types of arguments that will be on a stack when the particular instruction is executed, and executing the assembly language program, including the particular instruction, unless an object relative to which the programmatic method is to be invoked will not be on the stack when the particular instruction is executed;
   if the particular instruction is not of the particular kind, then checking, prior to execution of the assembly language program, the types of the arguments that will be on the stack when the particular instruction is executed, and if the types of the arguments do not match types of formal parameters that are associated with the programmatic method, then preventing the assembly language program from being executed; and
   during execution of the assembly language program, if the particular instruction is of the particular kind, then checking, during execution of the assembly language program, the types of the arguments that are on the stack when the particular instruction is to be executed, and if the types of the arguments do not match the types of the formal parameters that are associated with the programmatic method, then preventing the particular instruction from being executed.

2. The method of claim 1, wherein the steps further comprise:
   if the particular instruction is of the particular kind, then allowing the assembly language program to execute regardless of whether the type of the arguments match the types of the formal parameters.

3. The method of claim 1, wherein the steps further comprise:
   if the particular instruction is of the particular kind, then determining, prior to execution of the assembly language program, whether a number of arguments that will be on a stack when the particular instruction is executed matches a number of formal parameters that are associated with the programmatic method, and if the number of the arguments does not match the number of formal parameters that are associated with the programmatic method, then preventing the assembly language program from being executed.

4. The method of claim 1, wherein the steps further comprise:
   if the particular instruction is of the particular kind, then determining, prior to execution of the assembly language program, whether an object relative to which the programmatic method is to be invoked will be on the stack when the particular instruction is executed, and if the object will not be on the stack when the particular instruction is executed, then preventing the assembly language program from being executed.

5. The method of claim 1, further comprising:
   during execution of the assembly language program, if the particular instruction is of the particular kind, then for each particular argument on the stack that corresponds to a formal parameter that is not of type "Object," casting the particular argument to be of the formal parameter's type.

6. The method of claim 1, wherein determining whether the particular instruction is a particular kind of instruction comprises determining whether the particular instruction is a Java bytecode "invokevirtual" instruction, and wherein the particular instruction is not the particular kind of instruction if the particular instruction is a Java bytecode "invokevirtual" instruction.

7. The method of claim 1, wherein the assembly language program comprises Java bytecodes.

8. A volatile or non-volatile computer-readable medium carrying one or more sequences of instructions, which instructions, when executed by one or more processors, cause the one or more processors to carry out the steps of:
   prior to executing a typed assembly language program that contains a particular instruction that invokes a programmatic method when executed, performing particular steps comprising:
   determining whether the particular instruction is a particular kind of instruction;
   if the particular instruction is of the particular kind, then refraining from checking, prior to execution of the assembly language program, types of arguments that will be on a stack when the particular instruction is executed, and executing the assembly language program, including the particular instruction, unless an object relative to which the programmatic method is to be invoked will not be on the stack when the particular instruction is executed;
   if the particular instruction is not of the particular kind, then checking, prior to execution of the assembly language program, the types of the arguments that will be on the stack when the particular instruction is executed, and if the types of the arguments do not match types of formal parameters that are associated with the programmatic method, then preventing the assembly language program from being executed; and
   during execution of the assembly language program, if the particular instruction is of the particular kind, then checking, during execution of the assembly language program, the types of the arguments that are on the stack when the particular instruction is to be executed, and if the types of the arguments do not match the types of the formal parameters that are associated with the programmatic method, then preventing the particular instruction from being executed.

9. The volatile or non-volatile computer-readable medium of claim 8, wherein the particular steps further comprise:
   if the particular instruction is of the particular kind, then allowing the assembly language program to execute regardless of whether the type of the arguments match the types of the formal parameters.

10. The volatile or non-volatile computer-readable medium of claim 8, wherein the particular steps further comprise:
   if the particular instruction is of the particular kind, then determining, prior to execution of the assembly language program, whether a number of arguments that will be on a stack when the particular instruction is executed matches a number of formal parameters that are associated with the programmatic method, and if the number of the arguments does not match the number of formal parameters that are associated with the programmatic method, then preventing the assembly language program from being executed.

11. The volatile or non-volatile computer-readable medium of claim 8, wherein the particular steps further comprise:
   if the particular instruction is of the particular kind, then determining, prior to execution of the assembly language program, whether an object relative to which the programmatic method is to be invoked will be on the stack when the particular instruction is executed, and if the object will not be on the stack when the particular instruction is executed, then preventing the assembly language program from being executed.

12. The volatile or non-volatile computer-readable medium of claim 8, wherein the one or more sequences of instructions, when executed by one or more processors, cause the one or more processors to carry out the steps of:
   during execution of the assembly language program, if the particular instruction is of the particular kind, then for each particular argument on the stack that corresponds to a formal parameter that is not of type "Object," casting the particular argument to be of the formal parameter's type.

13. The volatile or non-volatile computer-readable medium of claim 8, wherein determining whether the particular instruction is a particular kind of instruction comprises determining whether the particular instruction is a Java bytecode "invokevirtual" instruction, and wherein the particular instruction is not the particular kind of instruction if the particular instruction is a Java bytecode "invokevirtual" instruction.

14. The volatile or non-volatile computer-readable medium of claim 8, wherein the assembly language program comprises Java bytecodes.

15. An apparatus comprising:
   one or more processors; and
   a memory coupled to said one or more processors, said memory storing instructions for performing steps comprising:
   determining, prior to executing a typed assembly language program that contains a particular instruction that invokes a programmatic method when executed, whether the particular instruction is a particular kind of instruction;
   refraining from checking, prior to execution of the assembly language program, types of arguments that will be on a stack when the particular instruction is executed, if the particular instruction is of the particular kind, and executing the assembly language program, including the particular instruction, unless an object relative to which the programmatic method is to be invoked will not be on the stack when the particular instruction is executed;
   checking, prior to execution of the assembly language program, the types of the arguments that will be on the stack when the particular instruction is executed, and if the types of the arguments do not match types of formal parameters that are associated with the programmatic method, then preventing the assembly language program from being executed, if the particular instruction is not of the particular kind; and
   checking, during execution of the assembly language program, the types of the arguments that are on the stack when the particular instruction is to be executed, and if the types of the arguments do not match the types of the formal parameters that are associated with the programmatic method, then preventing the particular instruction from being executed, if the particular instruction is of the particular kind.

16. The apparatus of claim 15, wherein the steps further comprise:
   allowing the assembly language program to execute regardless of whether the type of the arguments match the types of the formal parameters, if the particular instruction is of the particular kind.

17. The apparatus of claim 15, wherein the steps further comprise:
   determining, prior to execution of the assembly language program, whether a number of arguments that will be on a stack when the particular instruction is executed matches a number of formal parameters that are associated with the programmatic method, and if the number of the arguments does not match the number of formal parameters that are associated with the programmatic method, then preventing the assembly language program from being executed, if the particular instruction is of the particular kind.

18. The apparatus of claim 15, wherein the steps further comprise:
   determining, prior to execution of the assembly language program, whether an object relative to which the programmatic method is to be invoked will be on the stack when the particular instruction is executed, and if the object will not be on the stack when the particular instruction is executed, then preventing the assembly language program from being executed, if the particular instruction is of the particular kind.

19. The apparatus of claim 15, wherein the steps further comprise:
   casting, during execution of the assembly language program, for each particular argument on the stack that corresponds to a formal parameter that is not of type "Object," the particular argument to be of the formal parameter's type, if the particular instruction is of the particular kind.

20. The apparatus of claim 15, wherein determining whether the particular instruction is a particular kind of instruction comprises determining whether the particular instruction is a Java bytecode "invokevirtual" instruction, and wherein the particular instruction is not the particular kind of instruction if the particular instruction is a Java bytecode "invokevirtual" instruction.

21. The apparatus of claim 15, wherein the assembly language program comprises Java bytecodes.

* * * * *

UNITED STATES PATENT AND TRADEMARK OFFICE
CERTIFICATE OF CORRECTION

PATENT NO. : 7,574,700 B2  Page 1 of 1
APPLICATION NO. : 11/096933
DATED : August 11, 2009
INVENTOR(S) : Gilad Bracha It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1100 days.

Signed and Sealed this

Seventh Day of September, 2010

David J. Kappos
*Director of the United States Patent and Trademark Office*